UNITED STATES PATENT OFFICE.

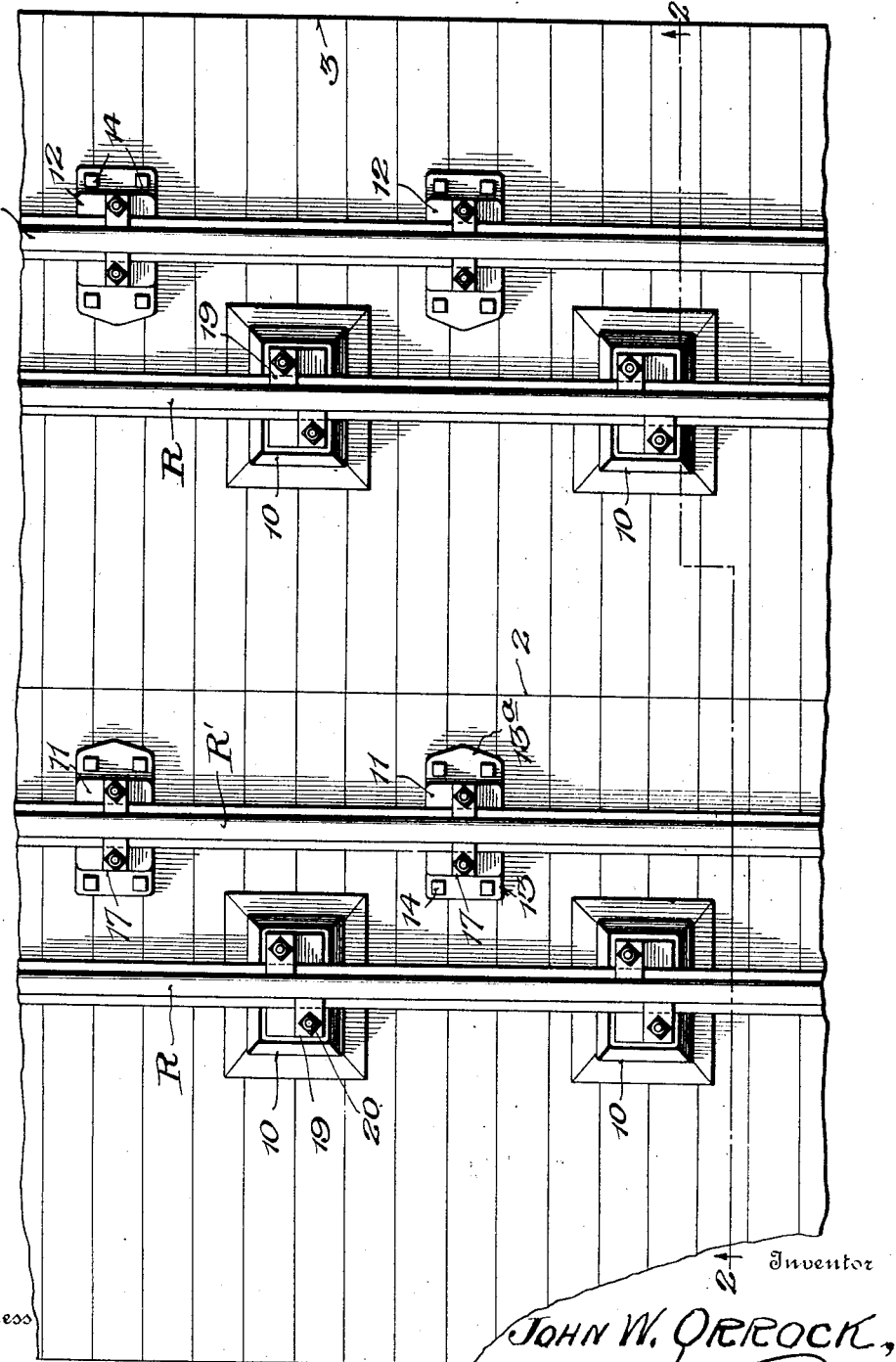

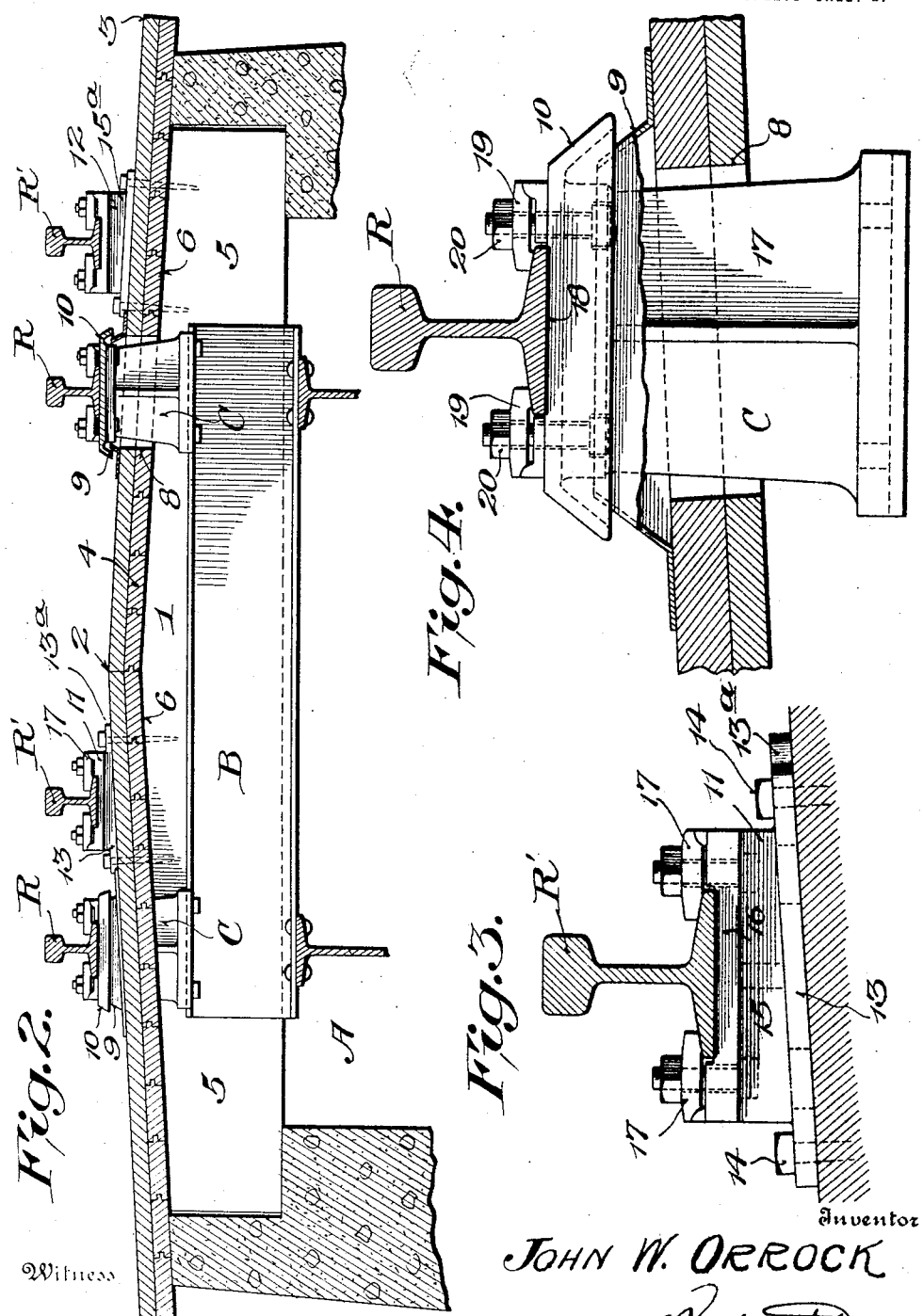

JOHN W. ORROCK, OF MONTREAL, QUEBEC, CANADA.

WEATHER-COVER FOR TRACK-SCALES.

1,335,599.  Specification of Letters Patent.  Patented Mar. 30, 1920.

Application filed April 22, 1919. Serial No. 291,809.

*To all whom it may concern:*

Be it known that I, JOHN W. ORROCK, a subject of the King of Great Britain, residing at Montreal, in the Province of Quebec, Dominion of Canada, have invented certain new and useful Improvements in Weather-Covers for Track-Scales, of which the following is a specification.

This invention relates to railway track-scale protection and more especially to an improved cover structure providing a thoroughly efficient and complete watershed and weather protector for the entire scale within the scale-pit.

Heretofore weather protection for track scale pits has been attempted by different methods and different forms of construction which have not satisfactorily met the requirements, especially in rigorous climates. Among the expedients heretofore employed have been to drain the floors of the track scales lengthwise, using metal weather strips or equivalent devices along the rails to exclude the water from the scale irons, and it has also been the custom to protect the openings in the floor, through which the live rail stands operate, by hinged and other kinds of weather strips. Also systems of spouts and guttering have been attempted in the effort to effectually prevent water from reaching the scale mechanism, but these and other forms of construction, as a weather protection for track scales, have proved troublesome and inadequate. Hence, the present invention has been designed with a view of obviating the objections to the former methods and constructions and to provide a cover structure or protecting deck entirely responsive to engineering and other requirements as an effective weather covering for track scales.

Accordingly, the present invention has for a primary object the construction of a simple but strong cover or deck structure for scale pits having the capacity to easily stand the loads imposed thereon, and which is adapted to not only support both the live and dead rails, but also provides a means for completely draining the scale cover both ways from the center thereof, thereby quickly shedding water by the shortest possible route and without the possibility of the same entering the scale pit and the scale mechanism.

In the construction of the cover or deck it is proposed to attain these desirable objects without the necessity of blocking, shimming or reinforcing the same to obtain the necessary strength and the proper disposition of parts to effect the water draining function.

More specifically the present invention has for its object the provision of a scale pit cover for supporting live and dead trackways, the rails of which are so mounted as to provide a relatively unobstructed water shed surface from the center of the cover toward the outer side edges thereof, while the supports or stands for the live rails, which only occur at spaced intervals, are provided with suitable means for excluding water to prevent the entrance of rain at the spaced openings where the live stands project through the covers.

With the above and other objects in view which will readily appear as the nature of the invention is better understood the same consists in the novel features, combination and arrangement of parts hereinafter more fully described, illustrated and claimed.

A preferred and practical embodiment of the invention is shown in the accompanying drawings in which:

Figure 1 is a top plan view of a portion of the improved pit cover.

Fig. 2 is a transverse sectional view taken on the line 2—2 of Fig. 1.

Fig. 3 is a detail view of one of the dead rail supports.

Fig. 4 is a detail view of one of the live rail supports.

Similar references designate corresponding parts throughout the several figures of the drawings.

In carrying the invention into effect it is proposed as shown in the drawings to provide a pit cover 1 of transversely arched formation with its crown 2 considerably higher than its outer edges 3 to insure the rapid drainage of water to each side of the longitudinal crest thereof. This pit cover may be of any desired construction, but as shown preferably consists of a flooring base 4 built upon transverse beams 5 whose upper supporting surfaces 6 are transversely arched or inclined to provide the necessary pitch. This flooring of the cover may have applied to the exposed side thereof any suitable surfacing material such for instance as felt paper covered with asphalt which renders the cover thoroughly water-proof.

In connection with this desirable construction it will have been observed that the floor beams 5 are tapered in both directions (by top beveling) from the center across the scale structure, which makes a simple but strong support for the flooring and the dead rail stands thereon. This feature of tapering the floor beams 5 both ways from the center maintains the full strength of the beams both from the standpoint of bending or shearing stresses, while at the same time providing the arched or crowned effect for the cover without the necessity of using blocking, shimming or reinforcing elements of any character.

The scale mechanism housed within the pit A includes the beams B for supporting the live rail stands designated generally as C, and these stands which project through the spaced openings 8 in the cover body constitute a plurality of individual supports for the live rails R. For the purpose of excluding water at the said openings the upper surface of the pit cover carries therewith an upstanding collar flange or flashing 9 adapted to coöperate with a depending hood flange 10 carried by the live rail stand C. There is of course sufficient space between the members 9 and 10 to permit the necessary vertical movement of the live stand parts without affecting the operation of the scale mechanism, and owing to the fact that the flange 9 is deepened at its outer end to compensate for the pitch of the cover, an effective telescoping umbrella joint is provided between the same and the hood to effectually exclude rain and other foreign matter. The said live stands C support the rails R of the live track-way a sufficient distance above the arched face of the pit cover to permit the free passage of water down the inclined surface thereof, and owing to the fact that the live rail stands C only occur at spaced intervals along the cover, no obstruction to lateral drainage is encountered in this respect.

Adjacent the rails R of the live trackway, it is also proposed to mount the rails $R^1$ of the dead track-way, and for the purpose of properly supporting the same on the pit cover to conserve the drainage feature heretofore set forth, it is intended to utilize special stationary dead rail stands which elevate the dead rails $R^1$ to the same level as the live rails R, and insure sufficient bottom clearance to permit the free passage of water to the outer side edges of the pit cover. These stands are respectively designated as 11 and 12, the former being mounted near the crown of the pit cover and between the live rails R, while the latter are located between one of the live rails R and the outer or water-discharging edge of the pit cover. And, as will be seen from Fig. 1, the said live and dead rails are arranged in staggered relation, thereby producing freely intercommunicating openings beneath the live and dead rails which assure the unobstructed drainage of the water from the deck.

Referring to Fig. 3 which shows one of the dead rail supports 11 it will be observed that the same includes, an inclined supporting base flange 13, the inner edge $13^a$ of which is pointed or peaked to deflect the water to each side thereof, and which may be securely attached to the upper surface of the pit cover by means of the spikes 14 or equivalent fastenings. Also the upstanding body portion 15 of the support has a horizontal rail supporting surface or seat 16. Fastening clips or equivalent means 17 may be used for engaging the flanges of the rail to hold the same rigidly on the said seat 16. This type of support therefore elevates the dead rail a sufficient distance above the surface of the pit cover to permit the free drainage of water beneath the same out to the edges of the cover. In connection with the mounting of the live rail stands 11 and 12 it will be observed that these stands are arranged on the cover or deck directly above the floor beams 5, and the fastenings 14 therefor may preferably be driven or secured directly into said floor beams thus providing a substantial and stable support for the dead rail stands.

The dead rail support 12 is structurally similar to the support 11, but because of the fact that it is located near the outer edge of the cover, the body portion $15^a$ thereof must necessarily be somewhat higher than the corresponding body portion of the support 11.

The live rail stands or supports heretofore designated as C consist of the supporting castings 17 having their lower ends adapted to be secured to the cross beams B of the scale mechanism, while their upper ends, in addition to being provided with the rail seating surfaces 18, are formed with the umbrella flange 10 previously referred to, the same coöperating with the upstanding collar or flashing 9 surrounding the opening 8 in the cover. Suitable rail clips 19 and bolts 20 may constitute the necessary means for rigidly securing the live rails R to their stands. By reason of the elevation of the live rails R above the water shed surface of the cover, and the effective means for excluding water and foreign matter at the openings the protecting and water shed features of the cover are properly conserved.

From the foregoing it is thought that it will be apparent that the present invention provides a practical, reliable, and efficient covering for protecting the scale mechanism in the pit while at the same time permitting of the use of both live and dead track sections.

I claim:

1. A weather cover for track scales comprising an arched cover or deck for the scale pit sloping transversely both ways from the peak thereof, a series of spaced projecting supporting stands for both the live and dead rails having rail seats disposed above the sloping surfaces of the cover, the supports for the dead rails having water deflecting surfaces, and the supports for the live rails having telescopically arranged water deflecting umbrella joints for the live stand openings.

2. A transversely arched cover for scale pits having openings therein, live rail carrying stands projecting through said openings for supporting a rail in an elevated position above the surface of the cover, and a plurality of dead rail supports secured at spaced intervals to the cover on opposite sides of the watershed and adapted to support a dead rail in an elevated position also above the surface of the cover to provide an unobstructed drain from the water-shed to the lateral edges of the cover.

In testimony whereof I hereunto affix my signature in the presence of two witnesses.

J. W. ORROCK.

Witnesses:
A. ARMSTRONG,
WILLIAM P. McFRAT.